Patented Aug. 28, 1945

2,383,902

UNITED STATES PATENT OFFICE 2,383,902

METHOD OF EXTRACTING VITAMIN C

Ryo Yamamoto and Takeshi Hara, Taiwan, Japan; vested in the Alien Property Custodian No Drawing. Application September 12, 1940, Serial No. 356,559. In Japan September 14, 1939

2 Claims. (Cl. 167—81)

The present invention relates to a method of extracting vitamin C, characterised by adding magnesium, or calcium or a mixture of magnesium and calcium in oxide or hydroxide form to a solution containing vitamin C, converting vitamin C in the alkaline state of the solution into a compound insoluble in water and alcohol, then suspending the compound in water or alcohol and treating the same with an acid which forms insoluble salts with magnesium or calcium, thus precipitating it and at the same time liberating vitamin C into the solution and finally concentrating it. The object thereof is to extract vitamin C very simply with a small loss and without the fear of retaining a substance bad for health.

It is known to separate vitamin C by treatment with lead salt solution. However, vitamin C is not merely lost by decomposition, but also as the vitamin C solution produced is apt to retain lead salt, there is a fear of its being injurious to health. Now, according to this invention, by adding magnesium or calcium or a mixture of magnesium and calcium in oxide or hydroxide form to a solution containing vitamin C, they are combined with vitamin C in alkaline condition and the compound thus obtained which is insoluble in water and alcohol is filtered and washed with water. Next, the vitamin C containing precipitate is suspended in water and acidified by an acid which forms insoluble salts with magnesium or calcium, for instance, carbonic acid, oxalic acid and phosphoric acid, so that it is made insoluble in water and at the same time vitamin C is liberated into the solution and is filtered. Then, by concentrating the filtrate under vacuum, concentrated vitamin C solution is produced simply with a good yield. In liberating the vitamin from vitamin C containing compound, if carbonic acid is employed, carbonate of magnesium or calcium remains in a slight quantity in the vitamin solution, which however is harmless unlike lead salt, whereas when oxalic acid is used, it is advisable to acidify the solution again with acetic acid and convert the remaining oxalic acid into calcium oxalate by adding lime and thus remove oxalic acid completely. The concentrated vitamin C solution thus obtained is used as such for medical or alimental purposes or made into milk powder containing much vitamin C, by mixing it with concentrated milk and drying it or is mixed with condensed milk to increase the quantity of vitamin C contained therein.

The following are examples of carrying out this invention into practice:

Example I

To 1,000 c. c. of the pineapple juice (the pineapple juice generally contains about 0.4 gram of vitamin C per 1,000 c. c.) concentrated to contain 1 milligram of vitamin C per c. c., is added calcium carbonate, and after deacidifying and filtering the mixture, the filtrate is rendered alkaline by adding 10 grams of magnesium oxide and 5 grams of calcium oxide successively. After combining them with vitamin C sufficiently, the insoluble vitamin C compound is filtered and the precipitate is washed with water. Then, suspending and dispersing the precipitate in water, it is acidified by the addition of oxalic acid to have the hydrogen ion concentration below pH 4. After passing carbonic acid gas through it, liberated vitamin C is filtered and acetic acid is added to the filtrate. Next, after removing the remaining small quantity of oxalic acid completely by adding milk of lime and filtering the above, the filtrate is evaporated under vacuum. In this way, it is possible to obtain a concentrated solution containing more than 0.5 gram of vitamin C per 50 c. c. of the concentrated solution.

Example II

After rendering 1,000 c. c. of the juice of the fruit of passion flower (contains 0.3 gram of vitamin C per 1,000 c. c.) weakly acidic and adding 30 grams of magnesium oxide to it to be combined with vitamin C sufficiently, the insoluble compound is separated by filtration and washed with water, and after suspending and dispersing in the water, it is decomposed by carbonic acid gas in the presence of phosphoric acid and filtered. Then, by concentration the filtrate under vacuum, there is obtained a concentrated solution containing more than 0.2 gram of vitamin C per 30 c. c. of the concentrated solution.

We claim:

1. The method of extracting vitamin C which consists in adding a compound of magnesium of the group consisting of the oxide and the hydroxide to a fruit juice containing vitamin C, maintaining the solution alkaline thereby converting the vitamin C into a compound insoluble in water and alcohol, then suspending the compound in water and treating the same with an acid which forms an insoluble salt of magnesium and liberating the vitamin C, separating the insoluble compound and concentrating the vitamin C solution.

2. The method of extracting vitamin C which consists in adding a compound of magnesium of the group consisting of the oxide and the hydroxide to a fruit juice containing vitamin C, maintaining the solution alkaline thereby converting the vitamin C into a compound insoluble in water and alcohol, then suspending the compound in water and treating the same with carbonic acid gas in the presence of phosphoric acid thereby forming an insoluble salt of magnesium and liberating the vitamin C, separating the insoluble compound and concentrating the vitamin C solution under vacuum.

RYO YAMAMOTO.
TAKESHI HARA.